United States Patent
Chu et al.

(10) Patent No.: US 11,308,588 B2
(45) Date of Patent: Apr. 19, 2022

(54) IMAGE PROCESSING METHOD, DEVICE, AND VIRTUAL REALITY DISPLAY APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Minglei Chu, Beijing (CN); Hao Zhang, Beijing (CN); Lili Chen, Beijing (CN); Chenru Wang, Beijing (CN); Yali Liu, Beijing (CN); Yukun Sun, Beijing (CN); Guixin Yan, Beijing (CN); Zhanshan Ma, Beijing (CN); Ziqiang Guo, Beijing (CN); Zehua Dong, Beijing (CN); Bingxin Liu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 279 days.

(21) Appl. No.: 16/494,588

(22) PCT Filed: Jan. 28, 2019

(86) PCT No.: PCT/CN2019/073452
§ 371 (c)(1),
(2) Date: Sep. 16, 2019

(87) PCT Pub. No.: WO2019/227958
PCT Pub. Date: Dec. 5, 2019

(65) Prior Publication Data
US 2021/0334943 A1    Oct. 28, 2021

(30) Foreign Application Priority Data
May 29, 2018    (CN) .......................... 201810534923.3

(51) Int. Cl.
*G06K 9/00*    (2006.01)
*G06T 5/00*    (2006.01)
(Continued)

(52) U.S. Cl.
CPC ............ *G06T 5/006* (2013.01); *G02B 27/022* (2013.01); *G06T 7/62* (2017.01); *G06T 7/70* (2017.01); *G06T 19/006* (2013.01)

(58) Field of Classification Search
CPC .................................................. G06T 19/006
See application file for complete search history.

(56) References Cited

U.S. PATENT DOCUMENTS 7,197,191 B2    3/2007  Okada et al.
7,813,585 B2    10/2010 Higurashi et al.
(Continued)

FOREIGN PATENT DOCUMENTS

CN    1450810 A    10/2003
CN    106204480 A   12/2016
(Continued)

OTHER PUBLICATIONS

International Search Report of PCT/CN2019/073452 in Chinese, dated Apr. 25, 2019, with English translation.
(Continued)

*Primary Examiner* — Hadi Akhavannik
(74) *Attorney, Agent, or Firm* — Collard & Roe, P.C.

(57) ABSTRACT

The present disclosure provides an image processing method, device, and virtual reality display apparatus for performing anti-distortion processing on images. The image processing method, for an electronic device including a lens
(Continued)

S501 — Determining a to-be-buffered image size according to a size of an input image and anti-distortion parameters of the lens unit S502 — Generating, based on the input image and the anti-distortion parameters, an anti-distortion buffer image having an image size according to the to-be-buffered image size unit, includes: determining a to-be-buffered image size according to a size of an input image and anti-distortion parameters of the lens unit; generating, based on the input image and the anti-distortion parameters, an anti-distortion buffer image having an image size according to the to-be-buffered image size.

17 Claims, 6 Drawing Sheets

(51) Int. Cl.
*G06T 7/62* (2017.01)
*G06T 7/70* (2017.01)
*G02B 27/02* (2006.01)
*G06T 19/00* (2011.01)

(56) References Cited

U.S. PATENT DOCUMENTS

| | | | |
|---|---|---|---|
| 9,818,803 B2 | 11/2017 | Lee | |
| 2013/0249947 A1* | 9/2013 | Reitan | G06F 3/011 345/633 |
| 2014/0009568 A1* | 1/2014 | Stec | G06T 5/006 348/36 |
| 2014/0192231 A1 | 7/2014 | Gunji et al. | |
| 2016/0105630 A1 | 4/2016 | Schaffer et al. | |
| 2017/0192236 A1* | 7/2017 | Chen | G09G 5/006 |
| 2018/0114298 A1 | 4/2018 | Malaika et al. | |
| 2019/0318449 A1* | 10/2019 | Wang | G06T 5/006 |

FOREIGN PATENT DOCUMENTS

| | | |
|---|---|---|
| CN | 206039041 U | 3/2017 |
| CN | 106600555 A | 4/2017 |
| CN | 106780758 A | 5/2017 |
| CN | 106873162 A | 6/2017 |
| CN | 108062156 A | 5/2018 |

OTHER PUBLICATIONS

Chinese Office Action in Chinese Application No. 201810534923.3 dated Aug. 25, 2021 with English translation.
Extended European Search Report in European Application No. 19812362.2 dated Feb. 18, 2022.
Anthes et al., State of the Art of Virtual Reality Technology, 2016 IEEE Aerospace conference, IEEE, Mar. 5, 2016, pp. 1-19, XP032916463.

* cited by examiner

IMAGE PROCESSING METHOD, DEVICE, AND VIRTUAL REALITY DISPLAY APPARATUS

CROSS-REFERENCE TO RELATED APPLICATIONS

This application is the National Stage of PCT/CN2019/073452 filed on Jan. 28, 2019, which claims priority under 35 U.S.C. § 119 of Chinese Application No. 201810534923.3 filed on May 29, 2018, the disclosure of which is incorporated by reference.

TECHNICAL FIELD

The present disclosure relates to the field of image processing, and more particularly to an image processing method, device, and virtual reality display apparatus for performing anti-distortion processing on images.

BACKGROUND

With the rapid development of virtual reality (VR) technology in the past years, people are increasingly demanding on VR displays, such as requiring higher resolution screens, shorter data delays, richer VR content, and so on. With the emergence of these requirements, some problems have arisen. For example, in order to adapt to higher resolution display screens, it is necessary to render display images with higher resolution, which will increase the rendering delay, and at the same time, the rendered high resolution display image needs to be subjected to anti-distortion processing, which further increases the delay.

SUMMARY

According to one aspect of the present disclosure, there is provided an image processing method for an electronic device including a lens unit, comprising: determining a to-be-buffered image size according to a size of an input image and anti-distortion parameters of the lens unit; generating, based on the input image and the anti-distortion parameters, an anti-distortion buffer image having an image size according to the to-be-buffered image size.

According to the embodiments of the present disclosure, generating an anti-distortion buffer image having an image size according to the to-be-buffered image size comprises: selecting one row of pixels from the input image to perform an anti-distortion operation, the anti-distortion operation including determining pixel data of an anti-distortion image corresponding to the one row of pixels according to the anti-distortion parameters, and writing pixel data of the anti-distortion image to the anti-distortion buffer image.

According to the embodiments of the present disclosure, selecting one row of pixels from the input image to perform an anti-distortion operation comprises: performing an anti-distortion operation progressively on each row of pixels in the input image.

According to the embodiments of the present disclosure, the anti-distortion parameters include an object-image relationship between heights of a plurality of pixels of the anti-distortion image and heights of a plurality of corresponding pixels in a virtual image formed by the anti-distortion image passing through the lens unit, and the object-image relationship is determined based on optical parameters of the lens unit.

According to the embodiments of the present disclosure, the optical parameters of the lens unit include a focal length of the lens unit, a distance between a display position of the input image and the lens unit, and a distance between a user viewing position and the lens unit.

According to the embodiments of the present disclosure, heights of a plurality of pixels in the anti-distortion image are respective distances from the plurality of pixels in the anti-distortion image to a mapped point on the input image of a lens center, heights of a plurality of corresponding pixels in the virtual image are respective distances from the plurality of corresponding pixels in the virtual image to a mapped point in the virtual image of the lens center.

According to the embodiments of the present disclosure, determining a to-be-buffered image size according to a size of an input image and anti-distortion parameters of the lens unit comprises: determining an anti-distortion grid for the input image based on the anti-distortion parameters, and coordinate values of four vertices of the anti-distortion image on the anti-distortion grid determined by using a center of the input image as an origin, and determining absolute values of the coordinate values of the four vertices in a column direction respectively; determining a minimum absolute value Y among absolute values of the coordinate values of the four vertices in the column direction; determining the to-be-buffered image size according to the minimum absolute value Y.

According to the embodiments of the present disclosure, the size of the input image is W*H, a size of the to-be-buffered image in a row direction is W, and a size of the to-be-buffered image in a column direction is k*H*(1−|Y|)+1, where k is a real number greater than or equal to 1.

According to the embodiments of the present disclosure, determining pixel data of an anti-distortion image corresponding to the one row of pixels according to the anti-distortion parameters, and writing pixel data of the anti-distortion image to the anti-distortion buffer image comprises: for each pixel in each row of pixel data in the input image, determining, a vector from a mapped point on the input image of the lens center to the pixel; determining a size of the virtual image based on the object-image relationship and the size of the input image; determining an image height of a corresponding pixel in the virtual image of the pixel according to the vector and the size of the virtual image; determining, based on the object-image relationship, an object height of a corresponding pixel in the anti-distortion image of the pixel according to the image height of a corresponding pixel in the virtual image; writing pixel data of the pixel to the to-be-buffered image according to the object height of the corresponding pixel in the anti-distortion image.

According to the embodiments of the present disclosure, writing pixel data of the pixel to the anti-distortion buffer image according to the object height of the corresponding pixel in the anti-distortion image comprises: determining a corresponding pixel in the to-be-buffered image of the corresponding pixel according to the object height of the corresponding pixel in the anti-distortion image, and storing a grayscale value of the pixel in the corresponding pixel in anti-distortion buffer image.

According to the embodiments of the present disclosure, for each pixel in each row of pixel data in the input image, determining a vector from a mapped point on the input image of the lens center to the pixel comprises: determining a distance and a direction from the mapped point on the input image of the lens center to the pixel.

According to the embodiments of the present disclosure, the image processing method further comprises: outputting a first row of pixel data of the anti-distortion buffer image for displaying and clearing already-displayed pixel data, and shift up each row of pixel data that is not yet displayed by one row in the anti-distortion buffer image.

According to the embodiments of the present disclosure, the image processing method further comprises: after the anti-distortion operation is performed on all the pixels of the input image, progressively outputting remaining image data in the anti-distortion buffer image for displaying.

According to another aspect of the present disclosure, there is provided an image processing device, comprising: a processor; and a first memory, wherein the first memory stores instructions which, when executed by the processor, causes the processor to perform the image processing method mentioned above; the image processing device further comprises a second memory configured to store a portion of the anti-distortion image.

According to another aspect of the present disclosure, there is provided a virtual reality display apparatus, comprising: a sensor configured to collect sensor data for determining a current state of the virtual reality display apparatus; a display unit configured to receive an input image determined based on the sensor data and perform anti-distortion processing on the input image to generate pixel data of an anti-distortion image, and perform display driving according to pixel data of the anti-distortion image, wherein the display unit includes the image processing device mentioned above; and a lens unit configured to image an image driven for displaying by the display unit.

According to the embodiments of the present disclosure, the sensor includes one or more of a speed sensor, an acceleration sensor, a geomagnetic sensor, a touch sensor, and a distance sensor.

According to the embodiments of the present disclosure, the display unit includes one or more of a central processing unit, a graphics processing unit, an FPGA, an ASIC, and a CPLD.

According to the embodiments of the present disclosure, the lens unit includes one or more of a convex lens, a Fresnel lens, and a concave lens.

BRIEF DESCRIPTION OF THE DRAWINGS

In order to more clearly illustrate the technical solutions of the embodiments of the present disclosure, hereinafter, the drawings necessary for illustration of the embodiments of the present application will be introduced briefly, obviously, the drawings described below are only some embodiments of the present disclosure, it is possible for a person of ordinary skill in the art to obtain other drawings based on these drawings without paying creative efforts. The following drawings are focused on showing the gist of the present disclosure, not schematically scaled by actual dimensions.

DETAILED DESCRIPTION OF THE EMBODIMENTS

For the objectives, the technical solutions, and the advantages of the embodiments of the present disclosure to be more clear, hereinafter, the technical solutions in the embodiments of the present disclosure will be described in a clear and complete way with reference to the accompanying drawings. Obviously, these described embodiments are merely parts of the embodiments of the present disclosure, rather than all of the embodiments thereof. Other embodiments obtained by a person of ordinary skill in the art based on the embodiments of the present disclosure without paying creative effort all fall into the protection scope of the present disclosure.

Unless otherwise defined, technical terms or scientific terms used in the present disclosure are intended to be understood in the ordinary meaning of a person of ordinary skill of the art. Words and expressions such as "first", "second" and the like used in the present disclosure do not denote any sequence, quantity or priority, but are used to distinguish different components. Likewise, words such as "include", "comprise" and the like refer to that an element or an object before this word contains all the elements or objects listed thereinafter or alternatives thereof, without excluding other elements or objects. Words such as "connected", "connecting" and the like are not restricted to physical or mechanical connections, but may include electrical connections, regardless of direct or indirect connections.

Figure 1:
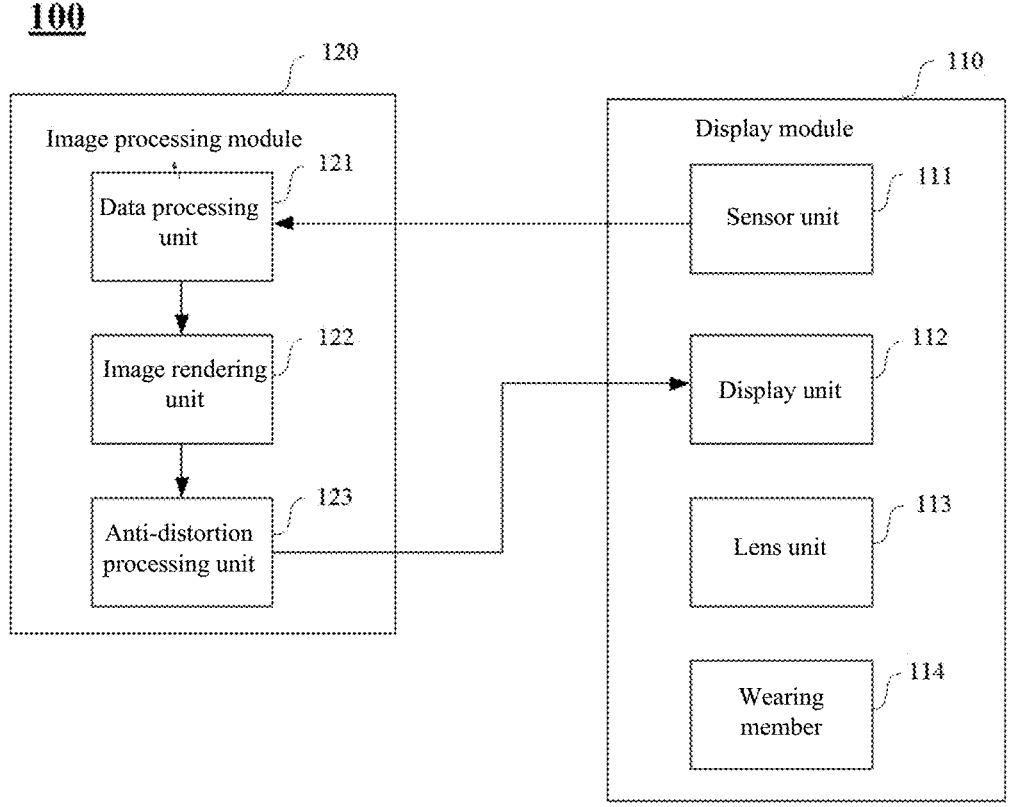
FIG. 1 shows a schematic block diagram of an image processing system 100 in accordance with the prior art.

FIG. 1 shows a schematic block diagram of an image processing system 100 in accordance with the prior art. As shown in FIG. 1, the image processing system 100 may comprise a display module 110 and an image processing module 120. The display module 110 is configured to detect a current gesture or action of a user, and send gesture data and/or action data to the image processing module 120 for image rendering. The image processing module 120 is configured to receive the gesture data and/or action data from the display module 110 and render an image to be displayed to the user for viewing according to the received gesture data and/or action data, and send the processed image to the display module 110 for displaying.

As shown in FIG. 1, the display module 110 may comprise a sensor unit 111, a display unit 112, and a lens unit 113.

The display unit 112 is configured to display an image to be displayed to a user for viewing. The display unit 112 may further comprise a display driving unit and a display screen. The display driving unit may be an integrated circuit module for driving the display screen according to the received image data and displaying an image corresponding to the image data on the display screen. The display screen here may be any type of display screen, such as an LED display screen, an OLED display screen, and the like.

The lens unit 113 may be configured to imaging an image displayed on the display screen to adjust a display position of the image, thereby facilitating viewing by the user. For example, in the current virtual reality display device, the display screen is generally placed in a position very close to the user's eyes, and the user cannot see the image displayed on the display screen by direct viewing. The lens unit 113 is configured to imaging the display screen (and the image displayed on the display screen), wherein the position of an image formed after the image displayed on the display screen passes through the lens unit 113 will fall in a comfort zone where the user's eyes focus, for example, at a distance suitable for viewing.

In some embodiments, the display module 110 may further include a wearing member 114. The wearing member 114 is configured to assist the user in fixing the display module 110 to be suitable for viewing.

The image processing module 120 is configured to perform data processing on an image to be displayed for viewing by a user. As shown in FIG. 1, the image processing module 120 may include a data processing unit 121, an image rendering unit 122, and an anti-distortion processing unit 123.

The data processing unit 121 may be configured to process sensor data collected and transmitted by the sensor unit 111, and determine, based on the received sensor data, a current state of the display module 110, such as the user's current gesture or action.

The image rendering unit 122 may be configured to perform rendering processing on an image to be displayed to the user for viewing according to the current state of the display module 110 determined based on the sensor data.

The anti-distortion processing unit 123 may be configured to perform an anti-distortion processing on the rendered image. As described above, the user needs to view the display image suitable for viewing displayed by the display unit 112 through the lens unit 113. The display screen formed by the lens unit 113 and the image of the image displayed on the display screen may be distorted due to, for example, optical parameters of the lens. The optical parameters of the lens unit 113 include a focal length of the lens unit 113, a distance between the display screen and the lens unit 113, a distance between a user viewing position and the lens unit 113, and the like.

Figure 2A:
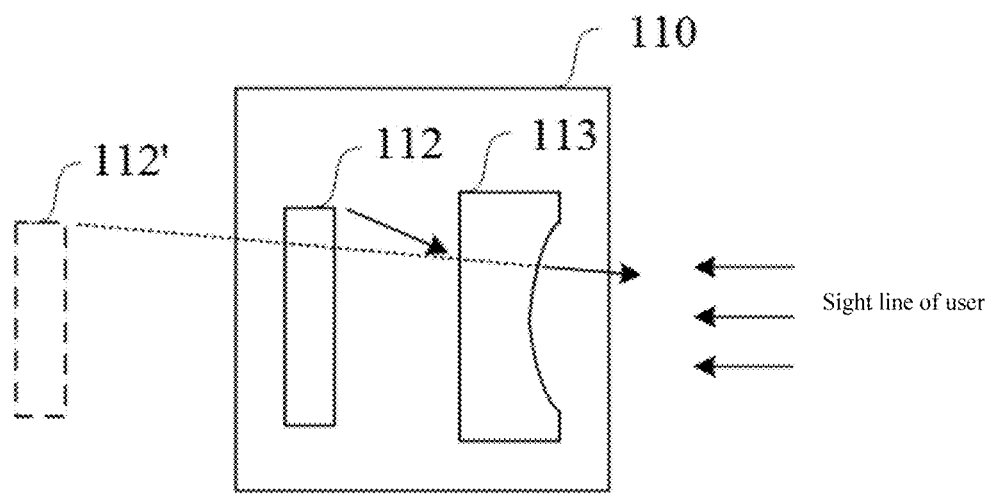
FIG. 2A shows a schematic diagram showing a process in which a user views an image displayed by a display unit through a lens unit.

FIG. 2A shows a schematic diagram of a process in which a user views an image displayed by the display unit 112 through the lens unit 113. The lens unit 113 is shown in FIG. 2A. It should be noted that the lens unit 113 is only shown in a schematic manner in FIG. 2A, the graphic shape in FIG. 2A does not constitute a limitation to the shape and properties of the lens in the lens unit 113. In fact, the lens unit 113 may be a single lens or a lens group composed of a plurality of lenses and optical elements. For example, the lens unit 113 may be a convex lens, a Fresnel lens, a concave lens, and any combination thereof. The lens unit 113 may also include other commonly used auxiliary optical imaging elements such as filters, pupils, gratings, and the like. After the image displayed by the display unit 112 through the display screen is imaged by the lens unit 113, a virtual image 112' of the image is formed at a position far from the user's eyes.

Figure 2B:
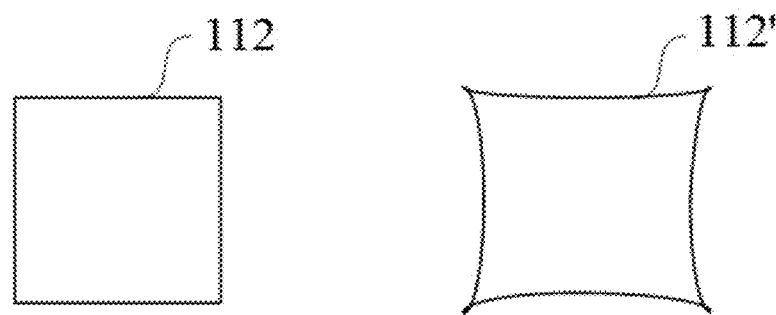
FIG. 2B shows a difference between the virtual image observed when viewing from the front and the original display image.

Since the lens unit 113 is not an ideal lens, the image being imaged by the lens unit 113 is distorted. FIG. 2B shows a difference between the virtual image 112' observed by the user when viewing from the front and the original display image 112. For example, in the related art, pincushion distortion appears in the image imaged by the lens unit 113 as viewed by the user. The farther it is away from the center of the image, the greater the distortion of the image is. It will be appreciated that, according to optical imaging principles, image distortion produced by lens imaging is related to the inherent characteristics of the lens. When imaging with the same lens unit, a distortion degree of the different images is the same. It should be noted that the pincushion distortion shown in FIG. 2B is merely illustrative, the distortion may also include a type of distortion such as barrel distortion and/or linear distortion.

In order to correct the above-described image distortion to improve the viewing experience of the user, one method is to perform an anti-distortion processing on the image to be displayed before being displayed.

The principle of the anti-distortion processing is that, in consideration of the distortion effect of the lens unit, the image to be displayed is subjected to deformation processing in advance, which can counteract the distortion effect caused by the inherent characteristics of the lens unit.

Figure 2C:
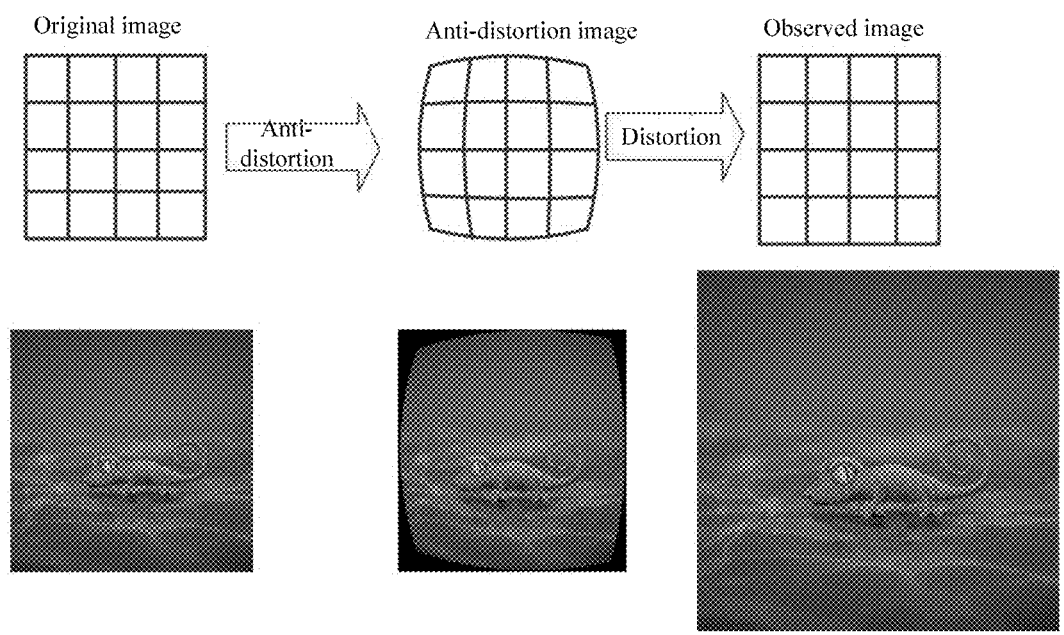
FIG. 2C shows an effect diagram of performing an anti-distortion process on an image.

FIG. 2C shows an effect diagram of performing an anti-distortion process on an image. As shown in FIG. 2C, in order for the user to observe an un-deformed image through the lens unit 113, the image to be displayed may be processed in advance to form a barrel-shaped anti-distortion image, and the barrel-shaped anti-distortion image is displayed on the display screen. Thus, when the user views the image formed by that the anti-distortion image passes through the lens unit 113, an image with no distortion (or distortion is less than a certain threshold) is observed, because after the anti-distortion image for displaying has been subjected to deformation processing shown in FIG. 2B, the distortion effect that the lens unit 113 may produce will be counteracted.

However, as the resolution of the display screen becomes higher and higher, the resolution of the displayed image also rises, resulting in an ever-increasing data amount of the image data, which brings a heavy data burden to the image processing device.

As can be seen from FIG. 1, in the process of performing the anti-distortion processing by the existing image processing system 100, the entire image needs to be subjected to anti-distortion, and the entire image after being subjected to the anti-distortion processing is sent to the display unit. In this process, processing and storage of the image requires huge system resources. Due to the large amount of data, the anti-distortion processing also increases the delay of image displaying.

In order to solve the above problems, the present disclosure provides an image processing method, device, and system.

Figure 5:
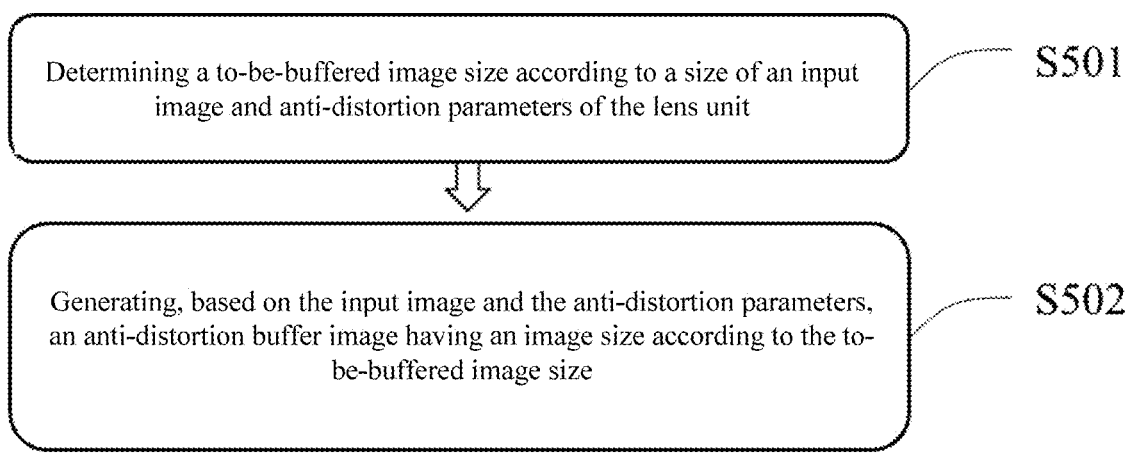
FIG. 5 shows a flow chart of an image processing method in accordance with an embodiment of the present disclosure.

FIG. 5 illustrates a flow chart of an image processing method in accordance with an embodiment of the present disclosure. As shown in FIG. 5, the image processing method 500 may comprise the following steps.

First, in step S501, a to-be-buffered image size is determined according to a size of an input image and anti-distortion parameters of the lens unit. In accordance with an embodiment of the present disclosure, the anti-distortion parameters of the lens unit may be determined by the properties of the lens unit itself. According to the principles of optical imaging, the lens unit will produce distortion during image forming, i.e., image deformation, this distortion is unavoidable. The anti-distortion parameters may relate to the image deformation, such as an object-height relationship between heights of a plurality of pixels of the anti-distortion image and heights of a plurality of corresponding pixels in the virtual image formed by that the anti-distortion image passes through the lens unit.

The input image may be a rendered image for viewing by a user, and the resolution of the input image may be the same as the resolution of the display screen, and the resolution may be denoted as the number of pixels included in the row direction and the column direction. For example, when the resolution of the display screen is W*H, that is, the display screen includes W*H pixels, the resolution of the input image may also be W*H.

Next, in step S502, based on the input image and the anti-distortion parameters, an anti-distortion buffer image having an image size according to the to-be-buffered image size is generated. The anti-distortion buffer image is an image that has been subjected to anti-distortion processing and is for being displayed.

In accordance with an embodiment of the present disclosure, generating an anti-distortion buffer image having an image size according to the to-be-buffered image size comprises: selecting one row of pixels from the input image to perform an anti-distortion operation. In accordance with an embodiment of the present disclosure, the anti-distortion operation may include: determining pixel data of an anti-distortion image corresponding to the one row of pixels according to the anti-distortion parameters, and writing pixel data of the anti-distortion image to the anti-distortion buffer image.

In some embodiments, selecting one row of pixels from the input image to perform an anti-distortion operation may comprise: progressively performing an anti-distortion operation on each row of pixels in the input image. In accordance with other embodiments of the present disclosure, an anti-distortion operation may also be performed on a portion of the pixels in the input image. For example, according to the principles of optical imaging, an object point closer to the optical axis of the lens unit has a smaller distortion at the time of imaging, and an object point farther away from the optical axis of the lens unit has a larger distortion at the time of imaging, thereby, one or more rows of pixels in the input image that are remote from the optical axis of the lens unit may be selected to perform an anti-distortion operation, while no anti-distortion operation is performed on the row of pixels near the optical axis in the input image.

In some embodiments, the anti-distortion parameters may include an object-image relationship between heights of a plurality of pixels of the anti-distortion image and heights of a plurality of corresponding pixels in a virtual image formed for the anti-distortion image through the lens unit, wherein the object-image relationship may be determined based on optical parameters of the lens unit. The optical parameters of the lens unit include a focal length of the lens unit, a distance between the displayed position of the input image and the lens unit, and a distance between a user viewing position and the lens unit. In some embodiments, the object-image relationship may be determined by measurement means.

For the image formed by the lens unit of the image processing system as described in the above, the "object" of the lens unit may be an image displayed on the display screen, that is, an anti-distortion image, a distance from each pixel on the anti-distortion image to the mapped point on the display screen of the lens center can be regarded as an "object height", and the distance from any point on the virtual image formed for the anti-distoration image through the lens unit to the mapped point on the virtual image of the lens center can be regarded as an "image height".

For example, in some embodiments, for an input image, an anti-distortion image, and a virtual image formed for the anti-distortion image through the lens unit, a height of a certain pixel in the image may refer to a distance from the pixel to the mapped point on the image of the lens center.

For example, in accordance with an embodiment of the present disclosure, a first virtual image may be formed for the input image passing through the lens unit, and the first virtual image is an image including distortion. The distortion is related to the parameters of the lens unit and the size of the input image (eg, pixel number and pixel size). Based on the principles of ideal optical imaging, respective pixels in the input image are in one-to-one correspondence with respective pixels in the first virtual image, and the object-image relationship of the lens unit can be represented based on a function for the object height of the pixels in the input image and the image height of the corresponding pixels in the first virtual image. The function for the object-image relationship is related to the optical parameters of the lens unit and the distance of the input image from the lens unit.

In accordance with an embodiment of the present disclosure, the function for the object-image relationship of the lens unit may be determined in a test manner. For example, according to a given object distance, that is, a distance value from an object point to the lens unit in a longitudinal direction, a series of object points at a position of the object distance may be selected, each of the object points has a height (for example, $y_m$), the height values of different object points are different. Then, an image height (for example, the image height value is $x_{m1}$) of an image point formed by imaging an object point (for example, the object height value is $y_{m1}$) through the lens unit is measured. Thereby, a data point ($y_{m1}$, $x_{m1}$) composed of the object height value and the corresponding image height value can be obtained. In accordance with other embodiments of the present disclosure, other manners may be employed to determine the object-image relationship of the lens unit, for example, using optical imaging simulation software, the present disclosure does not make limitation to the specific manner for determining the object-image relationship of the lens unit.

In accordance with an embodiment of the present disclosure, when an image displayed on the display screen is imaged by the lens unit, for example, an input image or an anti-distortion image, when the display screen is placed at an object distance at which the object-image relationship is measured, since the parameters of the lens unit does not change, the image points formed by that the pixels displayed on the display screen pass through the lens unit will also conform to the function for the object-image relationship obtained by the above measurement. In other words, the object height of the pixel displayed on the display screen and the image height of the corresponding image point conform to the object-image relationship.

In accordance with an embodiment of the present disclosure, function fitting may be performed on a set of measured data points consisting of the object height $y_m$ and the image height $x_m$ by a function fitting tool to obtain a curve of the object-image relationship between the image height $x_m$ and the object height $y_m$, and get the expression of the fitted function of the curve. The present disclosure does not limit the fitting tool configured to perform function fitting.

Figure 6:
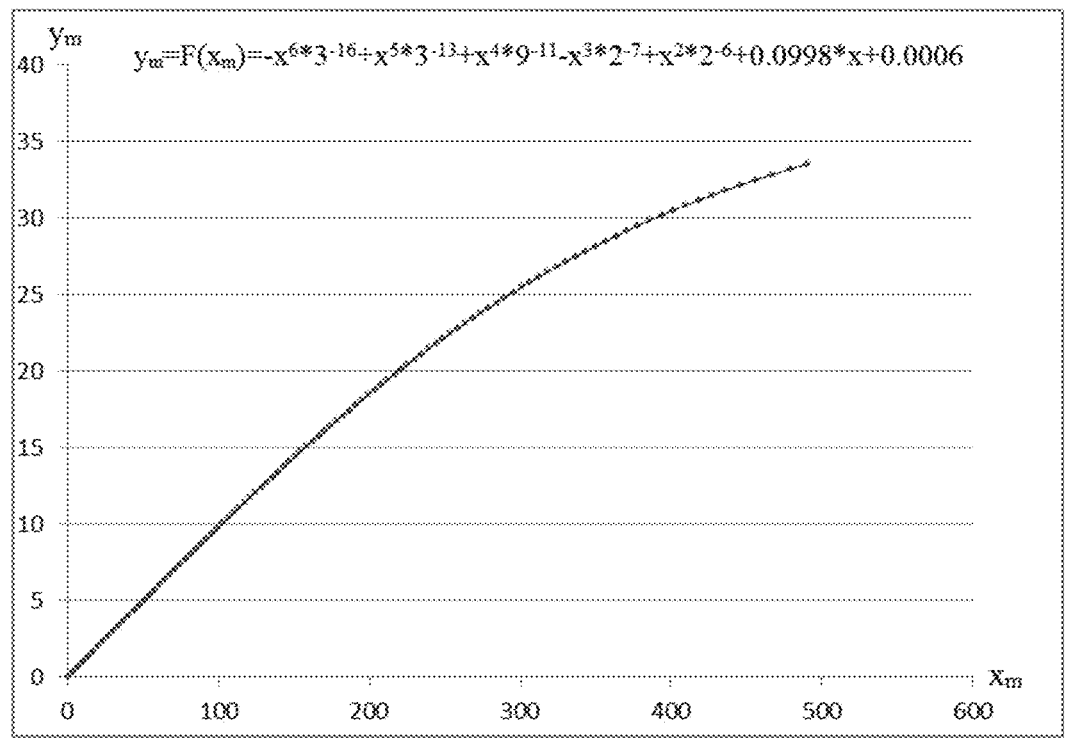
FIG. 6 shows a schematic diagram of a function for object-image relationship of an exemplary lens unit in accordance with an embodiment of the present disclosure.

FIG. 6 shows a schematic diagram of a function for an object-image relationship of an exemplary lens unit in accordance with an embodiment of the present disclosure.

Illustratively, a set of data points regarding object height and image height ($y_m$, $x_m$) can be obtained by measurement, for example, a set of data points as shown in FIG. 6, wherein the image height value of the data points shown in FIG. 6 is obtained based on measurement. Function fitting is performed on the discrete data points in FIG. 6 using a fitting tool to obtain a function that is closest to the curve constituted by the discrete data points. The function can characterize the numerical relationship between object height and image height. For example, the function between the object height ($y_m$) and the image height ($x_m$) corresponding to the lens unit can be obtained by fitting function which is as follows:

$$y_m=F(x_m)=-x^6*3^{-16}+x^5*3^{-13}+x^4*9^{-11}-x^3*2^{-7}+x^2*2^{-6}+0.0998*x+0.0006$$

The function $y_m=F(x_m)$ obtained by fitting shown in FIG. 6 can be configured to characterize the functional relationship between the image height $x_m$ and the object height $y_m$. It should be noted that the fitting function shown in FIG. 6 is only one possible example. When the optical parameters of the lens unit change, the functional relationship $F(x_m)$ between the image height $x_m$ and the object height $y_m$ also changes as the parameters change.

Values of an anti-distortion grid on the display screen can be determined using the functional relationship $y_m=F(x_m)$ between the object height $y_m$ and the image height $x_m$ of the lens unit determined as described above.

In accordance with an embodiment of the present disclosure, the process of determining the values of the anti-distortion grid on the display screen may include the following steps: first, a first virtual image formed for the input image after passing through the lens unit and being imaged may be calculated according to the imaging parameters of the lens unit, wherein the first virtual image is obtained by calculation, that is, the first virtual image does not contain distortion. In other words, the first virtual image is an ideal image without distortion that is expected to be displayed. For example, the imaging parameters may include a magnification of the lens unit, a focal length f, an object distance of an input image, and the like.

Thereafter, an object point corresponding to an image point within the first virtual image can be calculated based on the function $y_m=F(x_m)$. Specifically, an image height ($x_m$) of the image point within the first virtual image may be determined, then the value of the image height is substituted into the function $F(x_m)$, thereby calculating the value of the object height ($y_m$) of the object point corresponding to the image point. The above process is repeated for each pixel in the first virtual image to obtain the object height of each pixel in the anti-distortion grid, thereby the anti-distortion grid can be obtained.

Table 1 shows partial data of an exemplary anti-distortion grid in a coordinate system with the center of the display screen as an origin, in which x*, y* respectively represent abscissa and ordinate values of the corresponding normalized point on the anti-distortion grid, the abscissa and the ordinate of the corresponding point in Table 1 are all calculated according to the coordinate system of the anti-distortion grid.

TABLE 1

| x* | y* |
|---|---|
| −0.90076 | −0.85805 |
| −0.87876 | −0.86221 |

TABLE 1-continued

| x* | y* |
|---|---|
| −0.85631 | −0.86621 |
| −0.83378 | −0.87036 |
| −0.811 | −0.87452 |
| −0.78795 | −0.87868 |
| −0.76497 | −0.88316 |
| −0.74171 | −0.88764 |
| −0.71832 | −0.89227 |
| −0.69478 | −0.89707 |
| −0.67101 | −0.90195 |
| −0.64701 | −0.90691 |
| −0.62263 | −0.91179 |
| −0.59814 | −0.9169 |
| −0.57317 | −0.92182 |
| −0.54784 | −0.92666 |
| −0.5224 | −0.93178 |
| −0.49648 | −0.93666 |
| −0.47023 | −0.94149 |
| −0.44363 | −0.94625 |
| −0.41666 | −0.95089 |
| −0.38936 | −0.95545 |
| −0.36169 | −0.95985 |

Figure 7:
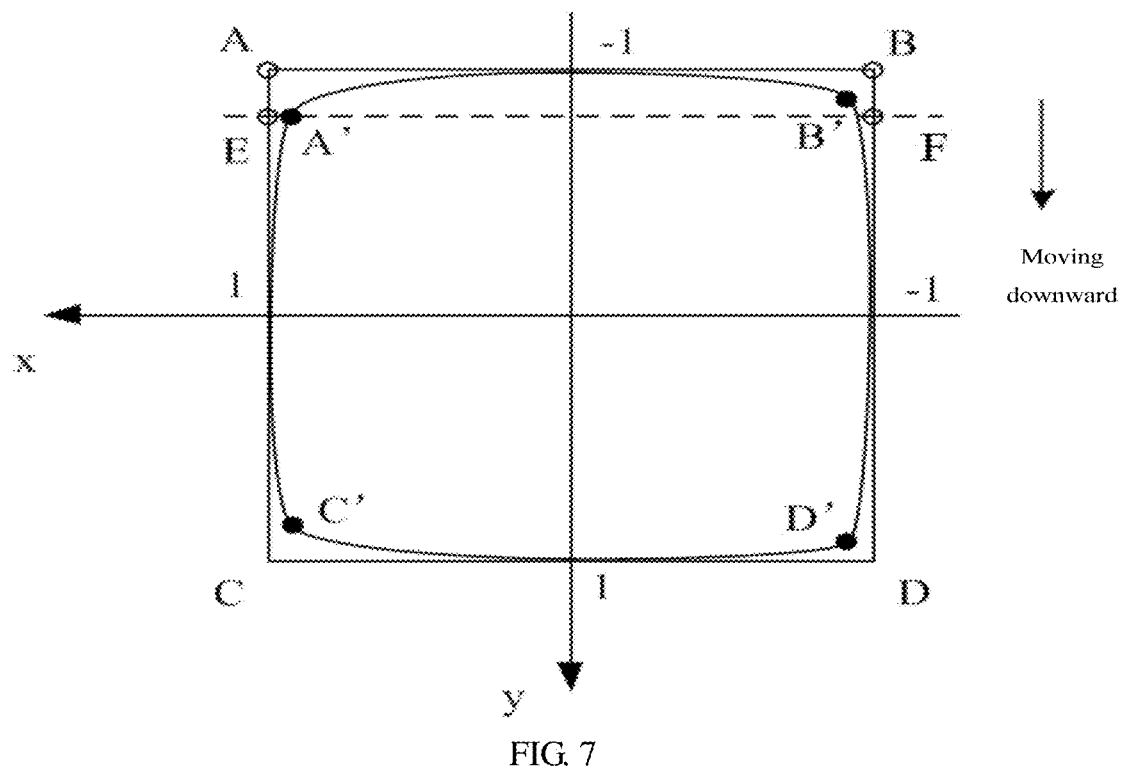
FIG. 7 shows a schematic diagram of an anti-distortion grid in accordance with an embodiment of the present disclosure.

The coordinate system of the above-described anti-distortion grid is shown in FIG. 7, wherein the origin of the coordinate system is the center of the input image. As shown in FIG. 7, in the coordinate system of the anti-distortion grid, a coordinate length of an intersection of the coordinate axes x, y and the boundary of the input image is defined as 1. The abscissa and the ordinate of the corresponding points in Table 1 are calculated from the coordinate system of the anti-distortion grid.

Referring back to FIG. 5, in some embodiments, step S501 may further comprise determining the to-be-buffered image size. In accordance with an embodiment of the present disclosure, coordinates of four vertices of the anti-distortion image on the anti-distortion grid determined using the center of the input image (i.e., the center of the display screen) as an origin may be determined, and absolute values of the coordinate values of the four vertices in a column direction of the input image are determined respectively; a minimum absolute value Y among absolute values of the coordinate values of the four vertices in the column direction is determined. Next, the to-be-buffered image size is determined according to the minimum absolute value Y. For example, the resolution of the input image may be W*H, the resolution in the row direction of the to-be-buffered image is W, and the resolution in the column direction of the to-be-buffered image may be k*H*(1−Y)+1, where k is a real number greater than or equal to 1.

For example, when k=1, the to-be-buffered image size in the column direction can be calculated by the formula H*(1−Y)+1. When k=2, the to-be-buffered image size in the column direction can be calculated by the formula 2*H*(1−Y)+1. It can be understood that k may be any real number greater than or equal to 1. For example, k may also take a value of 1.5, 2.8, and so on. The above examples do not constitute a limitation to the value of k.

FIG. 7 also schematically shows the to-be-buffered image size. In the coordinate system shown in FIG. 7, the row direction of the image is the x-axis, and the column direction thereof is the y-axis, the directions of the x and y axes may be set as shown in FIG. 7 and may be also set to any other possible forms, such as the x-axis direction is from left to right, and the y-direction is from top to bottom. As shown in FIG. 7, if the size of the input image is a rectangle composed of four vertices A, B, C, and D, it has W pixels in the x direction and H pixels in the y direction, that is, the resolution of the input image is W*H. Here, W and H represent the number of pixels of the input image in the x direction and the y direction, respectively. For example, W=2160, H=2376.

As described above, according to the imaging principles of the lens unit, the farther away it is from the center of the image, the greater the degree of distortion of the image is. In order to find a row of image data with the largest degree of distortion in the anti-distortion grid, the to-be-buffered image size can be determined by comparing the coordinate positions of the four vertices of the anti-distortion grid. In some embodiments, the distances from the four vertices of the anti-distortion grid to the corresponding vertices of the input image can be compared to determine the degree of deformation of the four vertices of the anti-distortion grid.

In some other embodiments, the to-be-buffered image size may be determined by the coordinates of the vertex that is furthest from the corresponding vertex of the input image. For example, the coordinates A'(x1, y1), B'(x2, y2), C'(x3, y3), D'(x4, y4) of the four vertices of the anti-distortion grid are determined, and a maximum of the abscissa and a minimum of the ordinate of the four vertices are calculated, i.e. X=max(abs(x1), abs(x2), abs(x3), abs(x4)) and Y=min (abs(y1), abs(Y2), abs(y3), abs(y4)), where abs(m) represents the absolute value of the value m. Thereby, the maximum X of the abscissa and the minimum Y of the ordinate of the four vertices can be calculated.

In accordance with an embodiment of the present disclosure, in order to at least write one row of image data having the largest degree of distortion (i.e., the coordinate value in the coordinate system is the smallest), the width of the to-be-buffered image may be set to be the same as the width of the display screen, and the height of the to-be-buffered image is set to be at least larger than the height of the row of image data with the largest degree of distortion. Thus, the minimum height of the to-be-buffered image can be expressed as k*H*(1−Y)+1, where k is a real number greater than or equal to 1, the minimum height represents the minimum number of pixel rows that can be stored in the to-be-buffered image.

The to-be-buffered image size indicates the row number and the column number of pixel data of the to-be-buffered image stored in the anti-distortion processing unit 2122. As can be seen from FIG. 7, the number of pixels in the horizontal direction of the to-be-buffered image is the same as the number of pixels in the horizontal direction of the display image, and the number of pixels in the vertical direction of the to-be-buffered image is determined by the minimum value Y of the ordinates of the four vertices. In the case shown in FIG. 7, k=1, as described above, k may also take a different value according to other embodiments of the present disclosure, such as k=1.5.

Referring back to FIG. 5, in some embodiments, step S503 may further comprise: for each pixel in each row of pixel data in the input image, determining a vector from a mapped point on the input image of the lens center to the pixel; determining a size of the first virtual image based on the object-image relationship and the size of the input image; determining an image height of a corresponding pixel in the virtual image of the pixel according to the vector and the size of the virtual image; determining, based on the object-image relationship, an object height of a corresponding pixel in the anti-distortion image of the pixel according to the image height of a corresponding pixel in the virtual image; writing pixel data of the pixel to the to-be-buffered image according to the object height of the corresponding pixel in the anti-distortion image.

Determining a vector from a mapped point on the input image of the lens center to the pixel comprises: determining a distance and a direction from the mapped point on the input image of the lens center to the pixel.

In some embodiments, the size of the virtual image formed for the anti-distortion image passing through the lens unit can be determined by the size of the input image and the anti-distortion parameters of the lens unit. For example, the length and width of the input image may be used as the object height, and the length and width of the virtual image may be determined based on a function for the object-image relationship of the lens unit. The length and width of the input image can be expressed by the number of pixels of the input image in the length and width directions. A person skilled in the art will appreciate that the actual size, such as the length and width of the display screen, can also be used as the length and width of the input image. In this case, there is a corresponding mapping relationship between the actual size of the display screen and the number of pixels of the input image, for example, the actual size of the display screen and the number of pixels of the input image can be converted by determining the actual size of the pixels on the display screen. The calculation in the following description is made by taking the pixel number of the input image in the length and width directions indicating the length and width of the input image as an example.

For example, the width of the virtual image may be $W_0$ and the height thereof may be $H_0$. By dividing the width of the virtual image into W parts, the length of each share is $w_0=W_0/W$, and the height is divided into H parts, and the length of each share is $h_0=H_0/H$. Here, W refers to the resolution of the input image in the row direction, that is, the number of pixels in the row direction, and H refers to the resolution of the input image in the column direction, that is, the number of pixels in the column direction. Thereby, a corresponding pixel on the virtual image of each pixel on the input image can be obtained.

In some embodiments, the coordinates of the lens center on the input image, the anti-distortion image, and the virtual image of the anti-distortion image may be determined.

According to the general imaging principle of the optical lens, in the ideal case, the lens center and the center of the display screen of the display device should coincide. That is to say, the lens center coincides with the center of the input image, the center of the anti-distortion image, and the center of the virtual image of the anti-distortion image. In the coordinate system of the anti-distortion grid with the center of the display screen as the origin as shown in FIG. 7, the coordinates of the lens center may be expressed as (0, 0). In the coordinate system in which the upper left corner (point A in FIG. 7) of the input image is used as the coordinate origin, in the case the straight lines where the length side and the width side of the input image are taken as the x and y axes respectively, the coordinates (PCI) of the lens center may be expressed as (W/2, H/2). PCI is used in the following description to indicate the position of the lens center in the input image.

However, considering the possible assembly errors between the lens and the display screen, the lens center may deviate from the center of the display screen. In this case, for example, the coordinates of the lens center in the coordinate system of the anti-distortion grid shown in FIG. 7 may be expressed as $(x_0, y_0)$, where $x_0, y_0$ may not be zero. At this time, in the coordinate system in which the upper left corner of the input image is used as the coordinate origin, when the length side and width side of the input image are respectively taken as the x and y axes, the coordinates of the lens center may be expressed as PCI $((1+x_0)*W/2, (1+y_0)*H/2)$. Since the lens center is not distorted when imaging through the lens, the mapped points of the lens center on the input image, the anti-distortion image, and the virtual image of the anti-distortion image are coincident along the optical axis of the lens unit.

In some embodiments, each time the anti-distortion processing unit receives one row of image data of the input image for processing. For example, when processing the i-th row of image, the anti-distortion processing unit receives a total of W pixel data. A distance between any pixel in this row of image data in the input image and the mapped point in the input image of the lens center may be calculated. For example, it is possible to calculate the coordinates of any pixel in this row of image data in the coordinate system in which the upper left corner of the input image is taken as the coordinate origin, and the straight lines where the length side and the width side of the input image reside are respectively used as the x and y axes of the coordinate system. For example, for the pixel p{j, i} of the i-th row and the j-th column, the coordinates of a pixel center may be expressed as $p(j-½, i-½)$. Therefore, for the pixel p{j, i} of the i-th row and the j-th column, where i=1, 2 ... W, j=1, 2 ... W, the vector from the pixel to the mapped point of the lens center may be expressed as $vec_p = p - PCI = (j-½-W/2, i-½-H/2)$. In some embodiments, since the values of H, W are quite large relative to ½ when the input image is a high resolution image, in some examples, the coordinates of the pixel center of the pixel p {j, i} may be simplified to (j, i), and $vec_p$ is simplified to $(j-W/2, i-H/2)$. In some examples, the vector $vec_p$ may be normalized, for example, the normalized vector $norm_p = vec_p / |vec_p|$, where $|vec_p|$ is a length of the vector $vec_p$.

The image height of the corresponding pixel p"{j, i} on the virtual image of the pixel p{j, i} may be calculated using the vector $vec_p$ and the size of the virtual image previously determined.

Herein, the corresponding vector of the vector $vec_p$ on the virtual image may be represented as vector I, where $I_X = vec_{p\_x} * w_0$, $I_Y = vec_{p\_y} * h_0$, where $I_X$ is a component in the x direction of the vector I, $I_Y$ is a component in the y direction of the vector I, $vec_{p\_x}$ is a component in the x direction of the vector $vec_p$, and $vec_{p\_y}$ is a component in the y direction of the vector $vec_p$.

According to the vector I, the object height $y_p$ of the corresponding point p'{j, i} on the anti-distortion image of the pixel p{j, i} may be determined, where $y_{px} = F(I_X)$, $y_{py} = F(I_Y)$, where F(x) is the object-image relationship function of the lens unit. That is to say, components in the x and y directions of the object height of the corresponding point p'{j, i} on the anti-distortion image of the pixels p{j, i} can be determined by using components in the x and y directions of the image height of the corresponding points p"{j, i} on the virtual image of the pixels p{j, i}, respectively. In addition, it has been previously explained that the object height here refers to the distance from the pixel to the mapped point on the anti-distortion image of the lens center, therefore, the distance from the corresponding point p' on the anti-distortion image of the pixel p{j, i} to the corresponding point PCI' on the anti-distortion image of the lens center may be determined according to the direction of the vector I and the object height obtained after anti-distortion. Since the row number and the column number of the corresponding pixel are used as the component values of the vector in the x and y directions when calculating both the vector $vec_p$ and the vector I, the components $y_{px}$ and $y_{py}$ of the object height $y_p$ in the x and y directions calculated by the above process may also represent the corresponding row number and column number in the anti-distortion image of the corresponding pixel p' on the anti-distortion image, wherein $y_{px}$ represents a corresponding column number of p'{j, i} in the anti-distortion image, $y_{py}$ represents a corresponding row number of p' in the anti-distortion image.

An input image ABCD and a barrel-type anti-distortion image A'B'C'D' corresponding to the input image are shown in FIG. 7. As described above, in the related art, it is necessary to store the complete anti-distortion image A'B'C'D'. In the method provided by the present disclosure, since the size of the to-be-buffered image is smaller than the size of the input image, it is impossible to store all the pixel data in the anti-distortion image corresponding to the input image into the to-be-buffered image. In some embodiments, since the method of progressively driving is employed in image display driving, pixel data corresponding to the anti-distortion image of the input image may be written progressively to the to-be-buffered image from the first row, and a progressive display driving is performed with respect to the to-be-buffered image.

In some embodiments, writing the pixel in the anti-distortion image to the to-be-buffered image according to the object height of the pixel in the anti-distortion image may further comprise: when the row number i of the read input image is less than or equal to row number h of the buffer area for the to-be-buffered image, that is, when i<=h, as for the pixel p{j, i} of the input image currently being processed, the pixel value (or grayscale value) of p{j, i} may be written to the pixel buffer $[y_{py}][y_{px}]$ in the $y_{py}$-th row and the $y_{px}$-th column of the to-be-buffered image buffer, that is, buffer[ypy][ypx]=p {j, i}. When the row number i of the read input image is greater than the row number h of the buffer area for the to-be-buffered image, that is, when i>h, the pixel value (or grayscale value) of p{j, i} may be written into the pixel buffer$[y_{py}-(i-h)][y_{px}]$ in the $(y_{py}-(i-h))$-th row and the $y_{px}$-th column, that is, buffer$[y_{py}-(i-h)][y_{px}]$=p{j, i}. The row number h of the buffer area may be half of the maximum row number of to-be-buffered image that can be stored in the buffer area, that is, h may be $½*k*H*(1-|Y|)+1$.

At the beginning of the anti-distortion process, as described above, the buffer area for the to-be-buffered image can at least store one row of pixel data having the largest degree of distortion in the anti-distortion image. Therefore, although as for the anti-distortion image, the farther it is from the center of the image, the greater the distortion of the image is, the to-be-buffered image buffer configured as described above can at least completely store pixel data of the anti-distortion image corresponding to the first row of image data in the input image.

In some embodiments, if the i-th row of data of the currently processed input image may be written to the to-be-buffered image buffer, this row of input image is subjected to the anti-distortion processing as described above, and the pixel value (such as grayscale value) of the corresponding pixel is written at a corresponding pixel position in the to-be-buffered image corresponding to the anti-distortion image of this row of input image. For example, at the beginning of the anti-distortion process, the to-be-buffered image buffer can store an anti-distortion image within the ABEF rectangle as shown in FIG. 7. FIG. 7 shows a case where the anti-distortion image determined by the ABEF rectangle has the same row number as the A' point, wherein the point A' is the position in the anti-distortion image of the point A in the first row in the input image, that is, the buffer area for the to-be-buffered image can just store the image data of the first row of the input image. In other embodiments in accordance with the present disclosure, the ABEF rectangle may also have a different row number than the A' point. For example, the row number of the anti-distortion image determined by EF may be slightly larger than the row number determined by A', i.e., points E, F may be located below point A'.

For point A, the position in the anti-distortion image of the corresponding point A' in the anti-distortion image of the point A may be determined by the aforementioned anti-distortion processing. Since the to-be-buffered image buffer has not been filled, it can be determined that the to-be-buffered image buffer corresponds to the first h rows of the display screen, and coordinates (for example, buffer $[y_{py}]$ $[y_{px}]$) of the corresponding position where the point A' may be written in the to-be-buffered image can be determined as described above.

If the to-be-buffered image buffer is already full, the first row of pixel data in the to-be-buffered image is outputted for displaying, and the first row of pixel data that has been displayed is cleared, and the already-buffered data is shifted up by one row in the to-be-buffered image buffer, that is, each row of pixel data in the to-be-buffered image is shifted up by one row.

Corresponding to the example in FIG. 7, it can be understood that after the processing in the previous step is performed, it is equivalent to that the data stored in the to-be-buffered image ABEF are changed from 1st row to h-th row of the anti-distortion image to 2nd row to (h+1)-th row. Taking FIG. 7 as an example, the to-be-buffered image buffer may be considered as being moved downward row by row with respect to the storage area of the anti-distortion image.

Therefore, when the row number i of the read input image is less than or equal to the height h of the to-be-buffered image buffer, that is, when i<=h, in other words, when the storage area of the to-be-buffered image has not started to move downward, pixel data of the pixel in the input image corresponding to the pixel p', that is, the point p, may be directly written in the $y_{py}$-th row and the $y_{px}$-th column of the anti-distortion image, that is, the pixel buffer$[y_{py}][y_{px}]$, according to the row number $y_{py}$ and the column number $y_{px}$ in the anti-distortion image of the pixel point p'. When the row number i of the read input image is greater than the row h of the buffer area for the to-be-buffered image, that is, when i>h, as described above, the to-be-buffered image has outputted i-h rows of anti-distortion data, so the current p' point should be written to the $(y_{py}-(i-h))$-th row and $y_{px}$-th column of the to-be-buffered image buffer, that is, the pixel buffer$[y_{py}-(i-h)][y_{px}]$.

In some embodiments, the image processing method 500 may further comprise a step S504 of outputting a first row of pixel data of the anti-distortion buffer image for displaying and clearing already-displayed pixel data, and shifting up each row of pixel data that is not yet displayed by one row in the anti-distortion buffer image. After the anti-distortion operation is performed on all the pixels of the input image, all remaining image data in the anti-distortion buffer image are outputted progressively for displaying.

For example, when the row number i of the read input image is less than or equal to the row number h of the buffer area for the to-be-buffered image, it waits and displaying is not performed. When the row number i of the read input image is greater than the row number h of the buffer area for the to-be-buffered image, each time one row of image data is processed, the display screen is driven to display according to the first row of data stored in the to-be-buffered image, and at the same time, the already-displayed image data is deleted, the data of other rows in the to-be-buffered image is moved up one row. When the image processing is completed, h rows of data in the to-be-buffered image are not displayed, and the h rows of data needs to be continuously outputted and displayed.

According to the image processing method provided by the embodiment of the present disclosure, the anti-distortion processing of the image can be integrated into the display module, thereby data processing burden of the image processing module is lowered, data delay is reduced, and versatility of the display module is improved.

Figure 3:
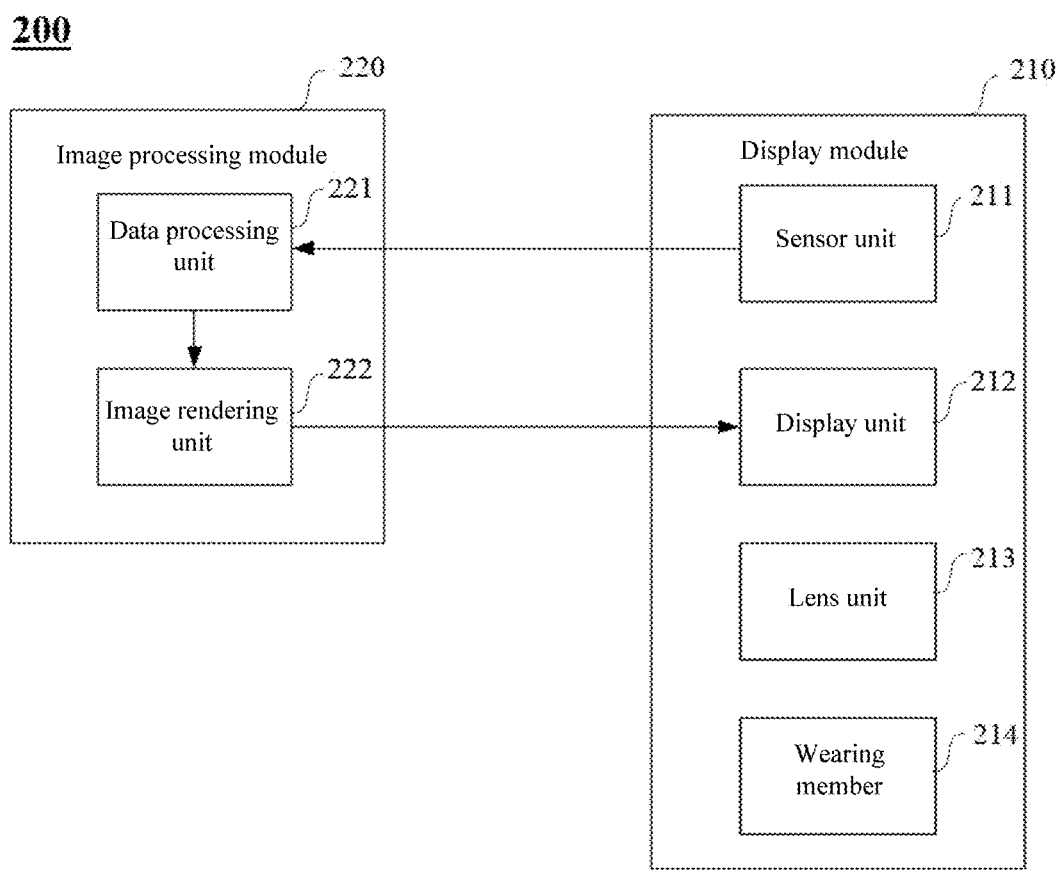
FIG. 3 shows a schematic block diagram of an image processing system in accordance with an embodiment of the present disclosure.

FIG. 3 shows a schematic block diagram of an image processing system 200 in accordance with an embodiment of the present disclosure. As shown in FIG. 3, the image processing system 200 may comprise a display module 210 and an image processing module 220. The image processing system 200 may be applicable to a virtual reality display device, an augmented reality display device, or the like.

The display module 210 may include a sensor unit 211, a display unit 212, and a lens unit 213. The display unit 212 may perform anti-distortion processing on the received image data to be displayed, and display an anti-distortion image generated after the anti-distortion processing.

The sensor unit 211 may be configured to detect the device and the user's current gesture or action as sensor data and transmit it to the image processing module 220. For example, the sensor unit 211 may be an inertial sensor, an action capture sensor, or other types of sensor. The inertial sensor may include a speed sensor, an acceleration sensor, a gyroscope, a geomagnetic sensor, or the like, for capturing the user's action and determining the user's gesture (such as a user's head gesture, body gesture, etc.). The action capture sensor may include an infrared sensor, a body sensor, a touch sensor, a position sensor, etc., it is configured to implement user action capture, particularly the user's front, rear, left, and right movement states. Other types of sensors may include sensors for detecting user status and position information, such as brainwave sensors, positioning equipment (Global Positioning System (GPS) equipment, Global Navigation Satellite System (GLONASS) equipment, Beidou navigation system equipment, Galileo positioning system (Galileo) equipment, Quasi-Zenith satellite system (QAZZ), a base station positioning device, a Wi-Fi positioning device), a pressure sensor, etc.), and may also include sensors for detecting a state of the surrounding environment, such as a light sensor, a temperature sensor, a humidity sensor etc. In addition, the sensor unit 211 may further include an image capturing device such as a camera or the like, for implementing functions such as gesture recognition, face recognition, and the like. The various types of sensors described above may be used alone or in combination to achieve the specific functions of the display module.

The display unit 212 is configured to receive image data to be displayed, and drive the display screen according to the received image data, and display an image corresponding to the image data on the display screen. In some embodiments, the display unit 212 may be further configured to perform anti-distortion processing on the received image data to obtain an anti-distortion image, and perform display driving according to the image data of the anti-distortion image that has been performed with anti-distortion processing. The display unit 212 may be implemented by one or a combination of a central processing unit CPU, a graphics processing unit GPU, an FPGA, an ASIC, and a CPLD.

The lens unit 213 may be configured to image an image displayed on the display screen to adjust the display position of the image, thereby facilitating observing by the user. For example, in the current virtual reality display device, the display screen is generally placed in a position very close to the user's eyes, and the user cannot see the image displayed on the display screen by direct viewing. The lens unit 213 is configured to image the display screen (and the image displayed on the display screen), wherein the position of the image formed after the image displayed on the display screen passes through the lens unit 113 will fall in the comfort zone where the user's eyes focus, for example, at a distance suitable for viewing. In some embodiments, the lens unit 213 may be a lens or a lens group. For example, the lens unit 213 may be a convex lens or a Fresnel lens or the like.

In some embodiments, the display module 210 may also include a wear member 214. The wearing member 214 is configured to assist the user in fixing the display module 210 for viewing. For example, the wearing member 214 may be glasses, a helmet, a mask, or the like, any accessory that may be configured to secure the display screen 210 in front of the user's eyes. In some embodiments, the wear member may also include accessories such as gloves, clothing, joysticks, and the like.

The image processing module 220 is configured to perform data processing on images to be displayed for viewing by the user. As shown in FIG. 3, the image processing module 220 may include a data processing unit 221 and an image rendering unit 222. In some embodiments, the image processing module 220 may be implemented by a computer.

The data processing unit 221 is configured to process the sensor data collected and transmitted by the sensor unit 211, and determine the current state of the display module, such as the current gesture or action of the user, according to the received sensor data.

The image rendering unit 222 is configured to perform rendering processing on an image to be displayed to the user for viewing according to the current state of the display module 210 determined based on the sensor data.

With the image processing system 200 provided by the embodiment of the present disclosure, the anti-distortion processing performed on the image may be integrated into the display module 210, thereby data processing burden of the image processing module 220 is lowered, delay caused by data transmission and the like is reduced, versatility of the display module 210 is improved.

Figure 4:
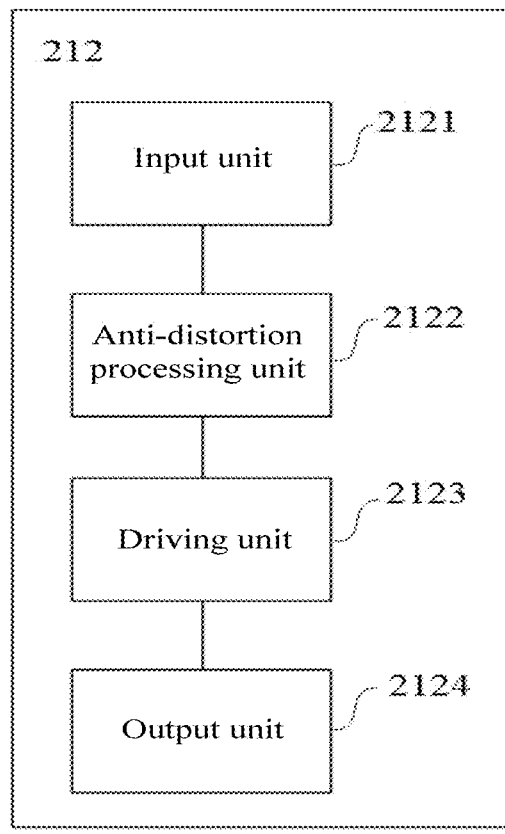
FIG. 4 shows a schematic block diagram of a display unit in accordance with an embodiment of the present disclosure.

FIG. 4 shows a schematic block diagram of a display unit 212 in accordance with an embodiment of the present disclosure. As shown in FIG. 4, the display unit 212 may include an input unit 2121, an anti-distortion processing unit 2122, a driving unit 2123, and an output unit 2124.

The input unit 2121 may be configured to receive image data to be displayed. In some embodiments, the input unit 2121 can receive the rendered image data from the image processing module 220 illustrated in FIG. 3. For example, the input unit 2121 may receive the image data that has been subjected to the rendering processing from the image rendering unit 222.

The anti-distortion processing unit 2122 may perform an anti-distortion processing on the image data received through the input unit 2121.

In some embodiments, the anti-distortion processing unit 2122 may be implemented by an integrated circuit. The anti-distortion processing unit 2122 may further include a memory for storing data required for performing an anti-distortion processing on the image. For example, the memory may be a RAM. For another example, the anti-distortion processing unit can implement reading and writing of data by connecting an external memory. The connecting here may be wired or wireless.

The driving unit 2123 can perform a driving function according to the image data that has been subjected to the anti-distortion processing. In some embodiments, the anti-distortion processing unit 2122 and the driving unit 2123 may be implemented as the same integrated circuit. In other embodiments, the anti-distortion processing unit 2122 and the driving unit 2123 may be implemented as different integrated circuits.

The output unit 2124 is configured to display the image data that has been subjected to the anti-distortion processing under control of the driving unit 2123. The output unit 2124 may be an image display device. As an example, the output unit 2124 may be a stand-alone display or other device including a display, including one or more devices such as a projection device, a mobile phone, a computer, a tablet, a television, a smart wearable device (including smart glasses such as Google Glass, a smart watch, a smart ring). a virtual display device, or a display enhancement device (such as Oculus Rift, Gear VR, Hololens).

With the anti-distortion processing unit 2122 provided by the embodiment of the present disclosure, the anti-distortion processing of the image can be integrated into the display module 210, thereby data processing burden of the image processing module 220 is lowered, data delay is reduced, and universality of the display module is improved.

Figure 8:
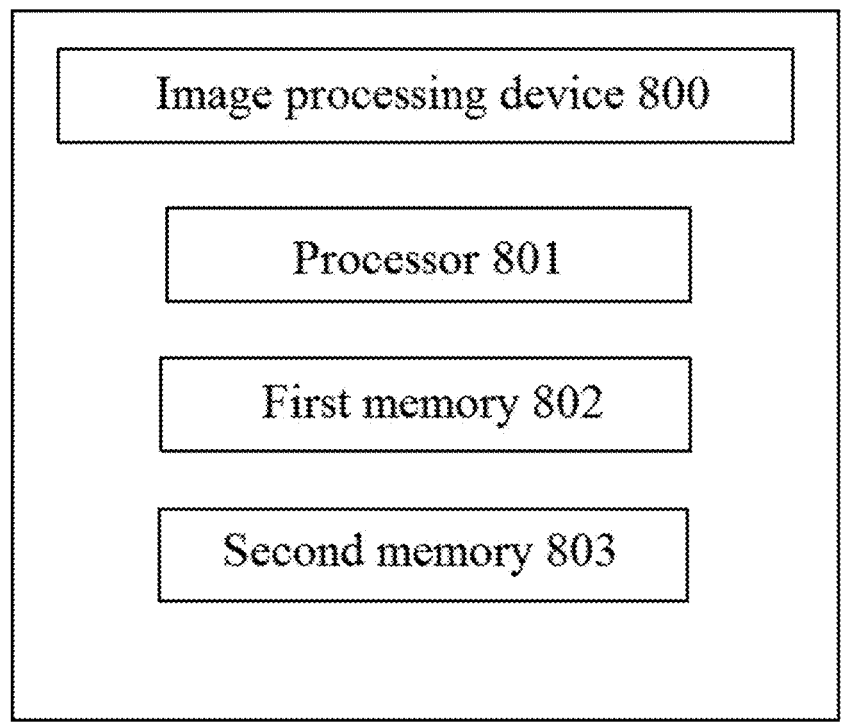
FIG. 8 shows a schematic diagram of an image processing device in accordance with an embodiment of the present disclosure.

According to another aspect of the present disclosure, an image processing device is also provided. FIG. 8 shows a schematic diagram of an image processing device 800 in accordance with an embodiment of the present disclosure.

As shown in FIG. 8, the image processing device 800 may comprise a processor 801 and a first memory 802. The first memory 802 stores instructions which, when executed by the processor 801, causes the processor 801 to execute the image processing method as described above.

The image processing device 800 in accordance with an embodiment of the present disclosure may further comprise a second memory 803. The second memory 803 may be configured to store a portion of the anti-distortion image. For example, a portion of the anti-distortion image may be an anti-distortion buffer image as described above. The anti-distortion buffer image may be generated based on the input image and the anti-distortion parameters. The size of the anti-distortion buffer image determined according to the size of the input image and the anti-distortion parameters of the lens unit may be a portion of the input image, rather than the entire input image. That is, the size of the anti-distortion buffer image obtained using the image processing method in accordance with an embodiment of the present disclosure is only a portion of the input image. For example, the row number of the buffer area configured to store the anti-distortion buffer image may be h as described above. Storing only a portion of the anti-distortion image may reduce the storage space for storing the anti-distortion image, reduce the data size in the transmission, and improve the transmission speed, as compared to storing a complete anti-distortion image corresponding to the size of the input image.

With the image processing method in accordance with the present disclosure, the anti-distortion processing for the input image may be integrated in the display module, thereby data processing burden of the image processing module is lowered, data delay is reduced, and universality of the display module is improved.

In order to implement different modules, units, and functions that are described in this application, a computer hardware platform may be utilized as a hardware platform for one or more of the elements described above. The hardware elements, operating systems, and programming languages of such computers are common and it is assumed that a person skilled in the art are sufficiently familiar with these techniques to be able to provide the information needed for image processing using the techniques described herein. A computer containing a user interface (UI) element may be used as a personal computer (PC) or other type of workstation or terminal device, and may be used as a server after being properly programmed A person skilled in the art will be considered to be familiar with such structures, programs, and general operations of such computer devices, and thus all drawings do not require additional explanation.

Such computers may include personal computers, laptops, tablets, cell phones, personal digital assistance (PDAs), smart glasses, smart watches, smart rings, smart helmets, and any smart portable device or wearable device. A particular system in an embodiment of the present disclosure utilizes a functional block diagram to explain a hardware platform that includes a user interface. Such a computer device may be a general purpose computer device or a computer device with a specific purpose. Both computer devices may be configured to implement the particular system in this embodiment.

The computer system may include a communication port to which a network that implements data communication is connected. The computer system may also include one processor for executing program instructions. The processor may be composed of one or more processors. The computer may include one internal communication bus. The computer may include different forms of program storage units and data storage units, such as a hard disk, read only memory (ROM), random access memory (RAM), which may be configured to store various data files for computer processing and/or communication use, and possible program instructions executed by the processor. The computer system may also include one input/output component that supports input/output data flow between the computer system and other components (such as a user interface). The computer system may also send and receive information and data.

Program portions of the technology may be considered to be "product" or "article" that exists in the form of executable codes and/or related data, which are embodied or implemented by a computer-readable medium. A tangible, permanent storage medium may include internal memory or storage used by any computer, processor, or a similar device or associated module. For example, various semiconductor memories, tape drivers, disk drivers, or any similar device capable of providing storage functionality for software.

All software or parts of it may sometimes communicate over a network, such as the internet or other communication networks. Such communication can load software from one computer device or processor to another. For example, loading from one server or host computer to a hardware environment of one computer environment, or other computer environment implementing the system, or a system having a similar function associated with providing information needed to determine electrical characteristics of the transistor at the operating temperature. Therefore, another medium capable of transmitting software elements can also be used as a physical connection between local devices, such as light waves, electric waves, electromagnetic waves, etc., to be propagated through cables, optical cables, or air. Physical medium used for carrying the waves such as cables, wireless connections, or fiber optic cables can also be considered as medium for carrying the software. In usage herein, unless a tangible "storage" medium is defined, other terms referring to a computer or machine "readable medium" mean a medium that participates in execution of any instruction by the processor.

A computer-readable medium may take many forms, including tangible storage medium, carrier medium or physical transmission medium etc. Stable storage medium may include optical or magnetic disks, as well as storage systems used in other computers or similar devices and capable of implementing the system components described in the drawings. Unstable storage medium may include dynamic memory, such as main memory of a computer platform. Tangible transmission medium may include coaxial cable, copper cable, and optical fiber, such as lines forming a bus within a computer system. Carrier transmission medium can transmit an electrical signal, an electromagnetic signal, an acoustic signal, or a light wave signal. These signals can be generated by methods of radio frequency or infrared data communication. Typical computer-readable medium includes hard disk, floppy disk, magnetic tape, any other magnetic medium; CD-ROM, DVD, DVD-ROM, any other optical medium; perforated card, any other physical storage medium containing an aperture pattern; RAM, PROM, EPROM, FLASH-EPROM, any other memory slice or tape; carrier for transmitting data or instructions, cable, or connection devices for transmitting carrier, any other program codes and/or data that can be read by a computer. Many of these forms of computer-readable medium appear in the process during which the processor executes instructions, and passes one or more results.

The "module" as used herein refers to logic embodied in hardware or firmware, or to a collection of software instructions. The "module" described herein may be implemented by a software and/or hardware module, or may be stored in any type of computer-readable non-transitory medium or other storage device. In some embodiments, a software module may be compiled and linked into an executable program. Obviously, the software module referred to herein can respond to information from itself or from other modules, and/or can respond to detected events or interrupts. The software module may be provided on a computer-readable medium, and may be configured for executing operations on computing devices (e.g., processor). The computer-readable medium referred to herein may be compact disc, digital video disc, flash drive, magnetic disc, or any other tangible medium. The software module may be obtained by way of digital download (the digital download may also include data stored in a compressed or installable package that needs decompression or decryption operations prior to execution). Codes of the software module referred to herein may be stored, partially or fully, on a storage device of the executing computing device, for being applied in operations of the computing device. Software instructions may be embedded in a firmware, such as EPROM. Obviously, the hardware module may include connected logic units, such as gates and flip-flops, and/or programmable units, such as programmable gate arrays or processors. The module or computing device functionality described herein may be implemented as software module preferably, but may be also represented in hardware or firmware. In general, the module described herein refers to logical module that that is not restricted by concrete physical states or the storage. One module may be combined with other modules or divided into sub-modules.

It should be noted that, in the specification, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise one . . . " do not exclude there being additional identity elements in the procedure, method, product or equipment of the elements.

Finally, it should be noted that, the above-described series of processing do not only comprise processing executed chronologically in the order mentioned here, and also comprise processing executed in parallel or individually but not chronologically.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and include several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and applications. To sum up, contents of this specification should not be construed as limiting the present disclosure.

What is claimed is:

1. An image processing method for an electronic device including a lens unit, comprising:
   determining a to-be-buffered image size according to a size of an input image and anti-distortion parameters of the lens unit; and
   generating, based on the input image and the anti-distortion parameters, an anti-distortion buffer image having an image size according to the to-be-buffered image size,
   wherein the determining a to-be-buffered image size according to a size of an input image and anti-distortion parameters of the lens unit comprises:
   determining an anti-distortion grid for the input image based on the anti-distortion parameters, and coordinate values of four vertices of an anti-distortion image on the anti-distortion grid determined by using a center of the input image as an origin, and determining absolute values of the coordinate values of the four vertices in a column direction respectively;
   determining a minimum absolute value Y among absolute values of the coordinate values of the four vertices in the column direction; and
   determining the to-be-buffered image size according to the minimum absolute value Y.

2. The image processing method according to claim 1, wherein generating an anti-distortion buffer image having the image size comprises:
   selecting one row of pixels from the input image to perform an anti-distortion operation, the anti-distortion operation including determining pixel data of the anti-distortion image corresponding to the one row of pixels according to the anti-distortion parameters, and writing pixel data of the anti-distortion image to the anti-distortion buffer image.

3. The image processing method according to claim 2, wherein the selecting one row of pixels from the input image to perform an anti-distortion operation comprises: performing an anti-distortion operation progressively on each row of pixels in the input image.

4. The image processing method according to claim 1, wherein the anti-distortion parameters include an object-image relationship between heights of a plurality of pixels of the anti-distortion image and heights of a plurality of corresponding pixels in a virtual image formed by the anti-distortion image passing through the lens unit, and the object-image relationship is determined based on optical parameters of the lens unit.

5. The image processing method according to claim 4, wherein the optical parameters of the lens unit include a focal length of the lens unit, a distance between a display position of the input image and the lens unit, and a distance between a user viewing position and the lens unit.

6. The image processing method according to claim 5, wherein heights of a plurality of pixels in the anti-distortion image are respective distances from the plurality of pixels in the anti-distortion image to a mapped point on the input image of a lens center, heights of a plurality of corresponding pixels in the virtual image are respective distances from the plurality of corresponding pixels in the virtual image to a mapped point in the virtual image of the lens center.

7. The image processing method according to claim 1, wherein the size of the input image is W*H, a size of the to-be-buffered image in a row direction is W, and a size of the to-be-buffered image in a column direction is k*H*(1−|Y|)+1, where k is a real number greater than or equal to 1.

8. The image processing method according to claim 2, wherein the determining pixel data of an anti-distortion image corresponding to the one row of pixels according to the anti-distortion parameters, and writing pixel data of the anti-distortion image to the anti-distortion buffer image comprises:
   for each pixel in each row of pixel data in the input image:
   determining a vector from a mapped point on the input image of the lens center to the pixel;
   determining a size of the virtual image based on the object-image relationship and the size of the input image;
   determining an image height of a corresponding pixel in the virtual image of the pixel according to the vector and the size of the virtual image;
   determining, based on the object-image relationship, an object height of a corresponding pixel in the anti-distortion image of the pixel according to the image height of a corresponding pixel in the virtual image;
   writing pixel data of the pixel to the to-be-buffered image according to the object height of the corresponding pixel in the anti-distortion image.

9. The image processing method according to claim 8, wherein the writing pixel data of the pixel to the anti-distortion buffer image according to the object height of the corresponding pixel in the anti-distortion image comprises:
   determining a corresponding pixel in the to-be-buffered image of the corresponding pixel according to the object height of the corresponding pixel in the anti-distortion image, and storing a grayscale value of the pixel in the corresponding pixel in anti-distortion buffer image.

10. The image processing method according to claim 8, wherein the determining, for each pixel in each row of pixel data in the input image, a vector from a mapped point on the input image of the lens center to the pixel comprises:

determining a distance and a direction from the mapped point on the input image of the lens center to the pixel.

11. The image processing method according to claim 1, further comprising:

outputting a first row of pixel data of the anti-distortion buffer image for displaying and clearing already-displayed pixel data, and shift up each row of pixel data that is not yet displayed by one row in the anti-distortion buffer image.

12. The image processing method according to claim 11, further comprising:

after the anti-distortion operation is performed on all the pixels of the input image, progressively outputting remaining image data in the anti-distortion buffer image for displaying.

13. An image processing device, comprising:

a processor; and a first memory, wherein the first memory stores instructions which, when executed by the processor, causes the processor to perform the an image processing method, wherein the method comprises:

determining a to-be-buffered image size according to a size of an input image and anti-distortion parameters of the lens unit; and generating, based on the input image and the anti-distortion parameters, an anti-distortion buffer image having an image size according to the to-be-buffered image size, wherein the determining a to-be-buffered image size according to a size of an input image and anti-distortion parameters of the lens unit comprises:

determining an anti-distortion grid for the input image based on the anti-distortion parameters, and coordinate values of four vertices of an anti-distortion image on the anti-distortion grid determined by using a center of the input image as an origin, and determining absolute values of the coordinate values of the four vertices in a column direction respectively;

determining a minimum absolute value Y among absolute values of the coordinate values of the four vertices in the column direction; and determining the to-be-buffered image size according to the minimum absolute value Y; and the image processing device further comprises a second memory configured to store a portion of the anti-distortion image.

14. A virtual reality display apparatus, comprising:

a sensor configured to collect sensor data for determining a current state of the virtual reality display apparatus;

a display unit configured to receive an input image determined based on the sensor data and perform anti-distortion processing on the input image to generate pixel data of an anti-distortion image, and perform display driving according to pixel data of the anti-distortion image, wherein the display unit includes the image processing device according to claim 13; and a lens unit configured to image an image driven for displaying by the display unit.

15. The virtual reality display apparatus according to claim 14, wherein the sensor includes one or more of a speed sensor, an acceleration sensor, a geomagnetic sensor, a touch sensor, and a distance sensor.

16. The virtual reality display apparatus according to claim 14, wherein the display unit includes one or more of a central processing unit, a graphics processing unit, an FPGA, an ASIC, and a CPLD.

17. The virtual reality display apparatus according to claim 14, wherein the lens unit includes one or more of a convex lens, a Fresnel lens, and a concave lens.

* * * * *